United States Patent [19]

Sato

[11] Patent Number: 5,097,405
[45] Date of Patent: Mar. 17, 1992

[54] SEQUENCE CONTROLLER

[75] Inventor: Yoshinori Sato, Hitachi, Japan

[73] Assignee: Hitachi, Ltd., Tokyo, Japan

[21] Appl. No.: 420,522

[22] Filed: Oct. 12, 1989

[30] Foreign Application Priority Data

Oct. 18, 1988 [JP] Japan .................. 63-262016

[51] Int. Cl.⁵ .................. G06F 9/00; G05B 19/00
[52] U.S. Cl. .................. 364/140; 364/131; 364/147
[58] Field of Search .............. 364/140, 141, 131–137, 364/142, 143, 146, 147

[56] References Cited

U.S. PATENT DOCUMENTS

| | | | |
|---|---|---|---|
| 4,608,661 | 8/1986 | Sasaki | 364/140 |
| 4,623,968 | 11/1986 | Niese | 364/140 |
| 4,683,549 | 7/1987 | Takaki | 364/141 |
| 4,742,443 | 5/1988 | Rohn et al. | 364/136 |
| 4,858,101 | 8/1989 | Stewart et al. | 364/131 |
| 4,916,600 | 4/1990 | Ropelato | 364/147 |

FOREIGN PATENT DOCUMENTS

0066144 4/1983 Japan .
0009503 1/1989 Japan .................. 364/140

Primary Examiner—Jerry Smith
Assistant Examiner—Thomas E. Brown
Attorney, Agent, or Firm—Antonelli, Terry, Stout & Kraus

[57] ABSTRACT

A mechanism to be sequentially controlled is divided into a plurality of functional blocks. Each functional block is assigned to a control block for sequentially controlling the functional block. The mechanism is sequentially and dispersedly controlled by a plurality of control blocks. Synchronization between control blocks is realized by referring to an input/output signal or an internal signal belonging to each control block. Each control block is set with an activation condition for turning on or off its own function so that the whole mechanism can be integrally controlled with an arbitrary condition. The sequence program for each control block is made by using an optimum one from among a conditional type definition, a sequential type definition and a combination of both definitions, in accordance with the control type of the program.

8 Claims, 8 Drawing Sheets

SEQUENCE CONTROLLER

BACKGROUND OF THE INVENTION

The present invention relates to a sequence controller, and more particularly to a programmable controller (hereinafter called "PC") for sequence control which is programmable by a user.

Conventionally, programs for a sequence control PC have been made by using either a conditional type definition typified by a Relay Ladder chart or a sequential type definition typified by a step incremental method. The control to be performed, however, often contains both a part suitable for conditional type control and a part suitable for sequential type control. In view of this, a PC operating on the basis of a combination of both these definitions has been proposed as shown in JP-A-58-66114.

According to JP-A-58-66114, the whole specification for sequential control is configured by using two types of conditional and sequential definitions, and the programs with the two definitions are executable by a single PC. According to this technique, programs using the conditional type definition are grouped into a plurality of conditional control blocks to thereby distinguish them from a plurality of sequential control blocks into which the other programs using the sequential type definition are grouped. With this conceptual technique, the conditional and sequential control blocks are formed, therefore, without any relation to the physical structure of an object to be controlled. For this reason, it is difficult to understand the physical structure of a controlled object from the sequence control specification, and conversely to form a sequence control specification properly matching the physical structure of the controlled object. There is accordingly some difficulty in making programs.

Similar problems also arise even if a Petrinet graph presently attempted in the art is used.

Figure 8:
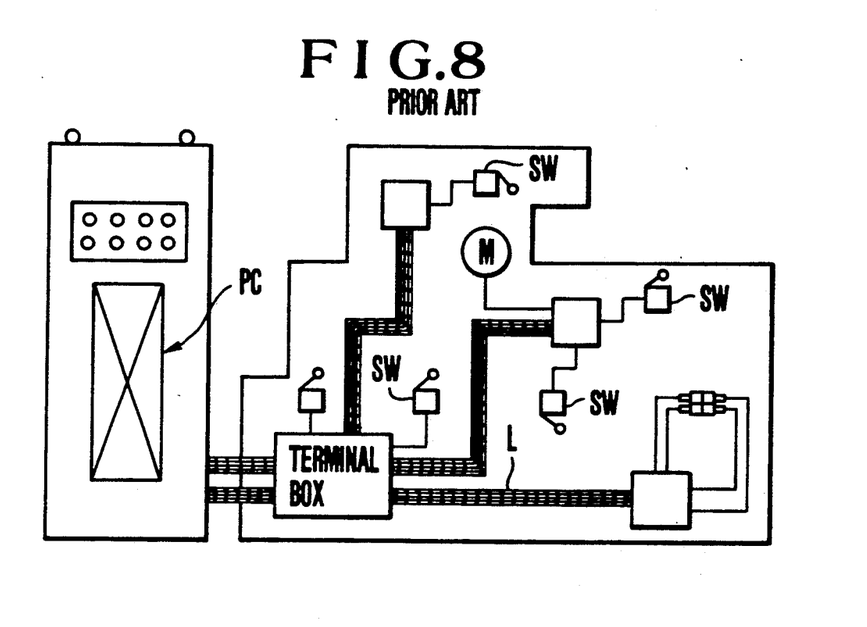
FIG. 8 is a schematic diagram showing how a single PC has controlled heretofore a plurality of functional blocks.

If a mechanism is to be sequentially controlled by a single PC, a plurality of connection wirings L are extended from the single PC to various physical elements, such as switches, motors and the like as shown in FIG. 8. As a result, not only do the number of wirings become enormous, but also the structure becomes complicated so that many accidents become possible. In addition, the scale of programs to be executed by the PC becomes large, resulting in a difficulty in making and maintaining programs.

SUMMARY OF THE INVENTION

It is an object of the present invention to provide a sequence controller for sequentially controlling a mechanism by using programs which are readily associatable with the physical structure of the mechanism.

In order to achieve the above object of this invention, a mechanism and function to be controlled is divided into a plurality of functional blocks, and each block is assigned a control block with an activation condition. Control programs suitable for the function of a functional block of the associated control block are made by using a conditional type definition, a sequential type definition, or a combination thereof. All control blocks are distributively allocated to a plurality of PCs. Each PC executes the programs for the allocated control blocks in a multi task processing to thereby dispersedly execute the sequence control of the mechanism. With such an arrangement, programs can be provided for each control block while using a representation in close association with the corresponding functional block, and in an easily-understandable form.

The control block described in this invention will be explained with reference to FIGS. 1 and 2.

Figure 1:
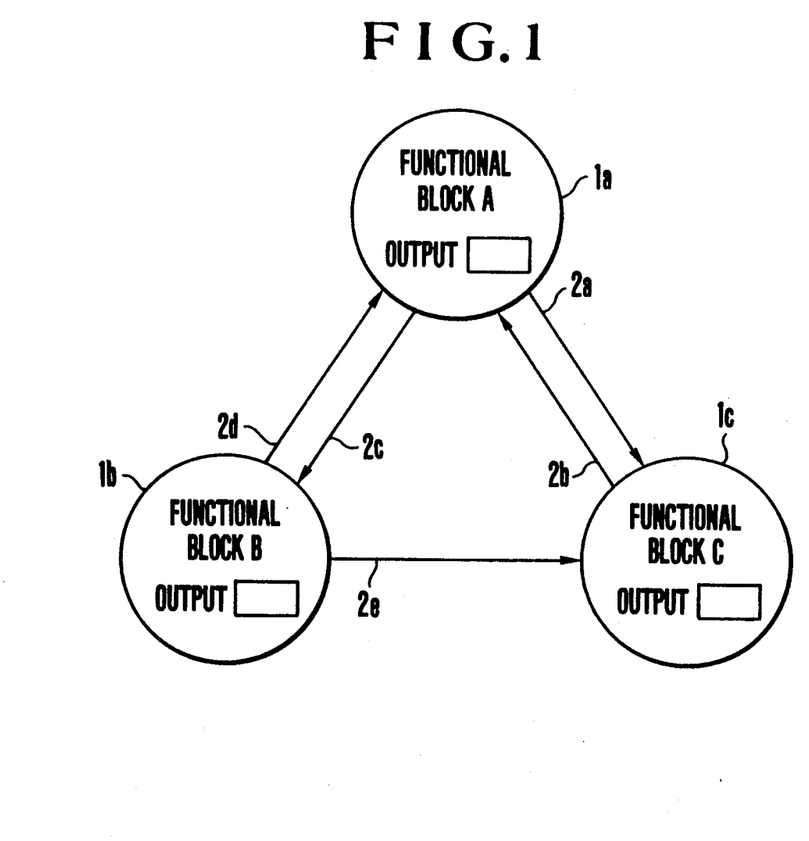
FIG. 1 conceptually illustrates control blocks used in this invention.

Functional collections, i.e., functional blocks A, B and C of a mechanism and function to be sequentially controlled, are represented by circles as shown in FIG. 1. The regions within the circles are called control blocks 1a, 1b and 1c which share an output to be controlled, respectively, and this diagram is called a control block diagram. The control blocks for the functional blocks are interconnected by arrows 2a, 2b, 2c, 2d and 2e each affixed with the name of a signal such as an input/output signal, an internal signal or the like, the head of each arrow being directed to the control block to which the referenced signal is supplied.

Figure 2:
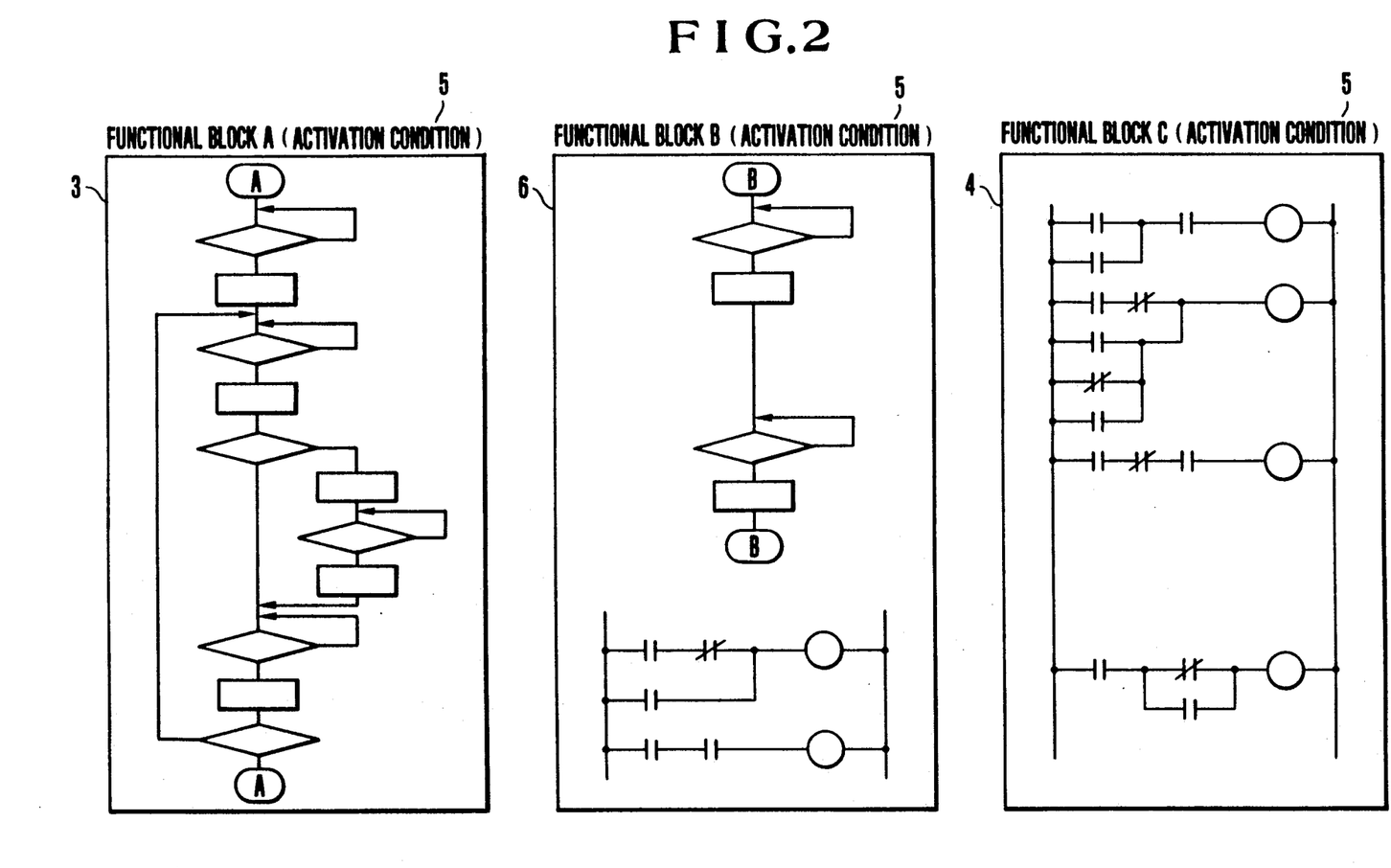
FIG. 2 is a schematic diagram showing the types of definition for the programs of each control block.

Next, as shown in FIG. 2, the control specification for control outputs in each control block is configured by using a sequential type definition, a conditional type definition, or both of the definitions. For each control block, an activation condition is designated to specify whether its control specification is enabled or disabled.

Each control block, 1a, 1b, 1c shown in FIG. 1 corresponding to the functional block A, B, C to be sequentially controlled, performs a control operation for a signal to be outputted therefrom.

For example, in the control block 1a, which executes a set of sequential operations, the controlled outputs from the block 1a are respective actuators which perform the set of operations. The control specification of this control block is preferable if it is configured by using the sequential type definition as indicated at 3 in FIG. 2.

For the control block 1c, whose controlled outputs follow a conditional operation, the control specification is preferable if it is configured by using the conditional type definition as indicted at 4 in FIG. 2.

There is also the case where it is preferable to configure the control specification of the control block 1b by using both sequential and conditional type definitions in accordance with the outputs controlled within the block, as indicated at 6 in FIG. 2.

As described above, each control block has certain controlled outputs and the contents of the control specification for each control block are configured independently by using a suitable definition. Therefore, the control diagram shown in FIG. 1 can be made analogous to the physical structure of a mechanism to be controlled.

In a mechanism which performs physical operations to be sequentially controlled, it is empirically known that as the signal reference between control blocks becomes more dense, the more the control blocks are related to each other in a physical sense. The reason for this is that a set of sequential operations such as handling, working or the like is carried out under a certain physical constraint or condition.

In general, as the number of arrows indicating referenced signals between control blocks becomes larger, the more the control blocks are related to each other in a physical sense.

If control blocks are disposed so as to make the length of the referenced signal arrows as short as possible, then the control block diagram almost necessarily reflects the physical structure of a mechanism to be controlled. Therefore, the control blocks can be arranged in direct association with the physical structure while indicating the relationship between blocks by arrows with signal names.

DESCRIPTION OF THE PREFERRED EMBODIMENT

Figure 3:
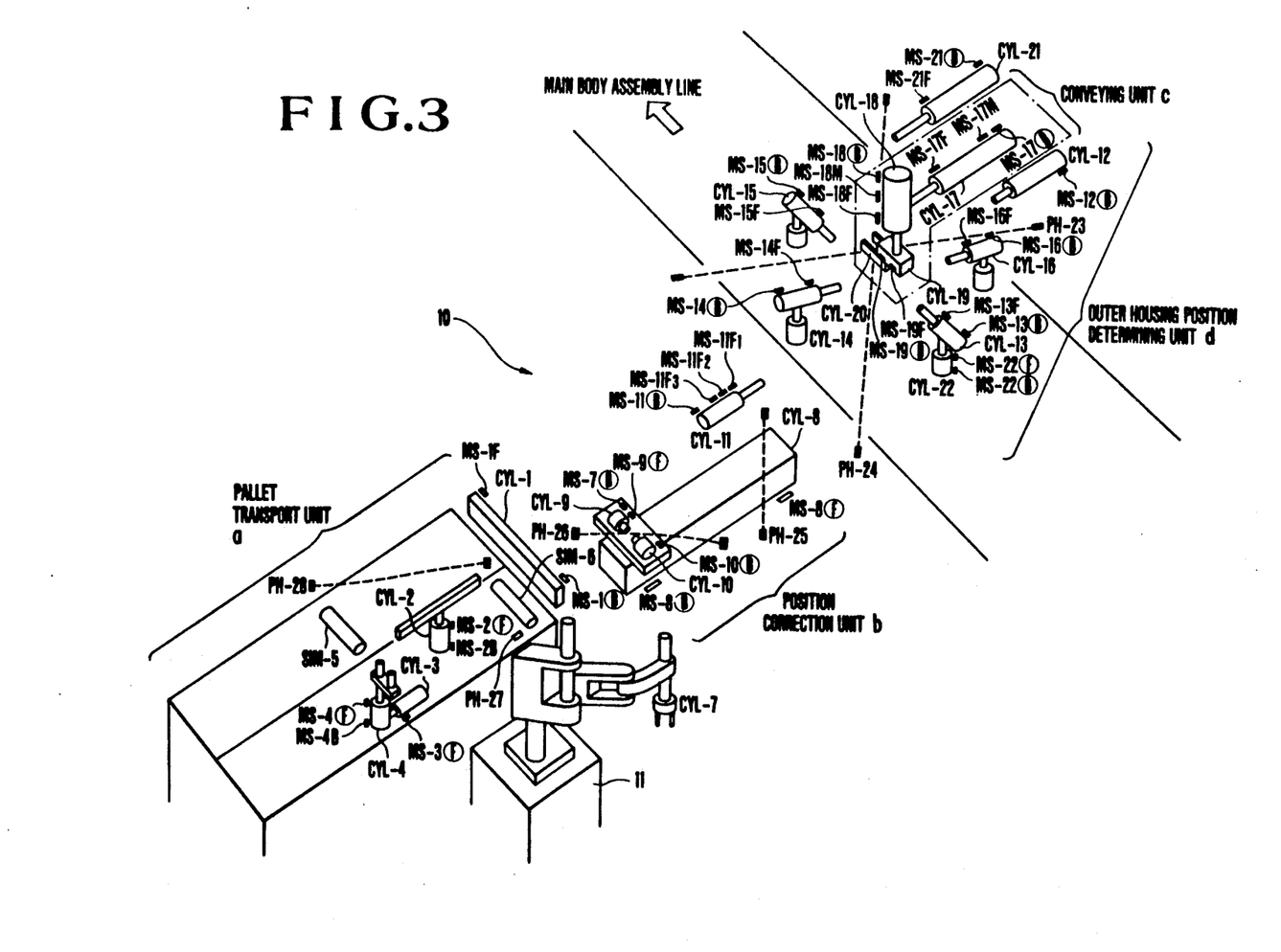
FIG. 3 is a schematic view illustrating the element positions of a capacitor assembling station which is shown as an example of mechanisms to be controlled by the sequence controller of this invention.

The disposal of elements of a capacitor assembling station on a laundry machine main body assembly line is shown in FIG. 3 as an example of objects to be sequentially controlled.

The apparatus 10 is constructed of the following elements. Namely, apparatus 10 includes a pallet transport unit a for supplying a pallet within which capacitors are aligned and for discharging an empty pallet, a robot 11 for sequentially picking up a capacitor from the pallet, a position correction unit b for determining the posture of a capacitor, a conveying unit c for conveying a capacitor to a capacitor assembly site, an outer housing position determining unit d for determining the position of a laundry machine on which a capacitor is assembled, and a thread fastener for use in mounting a conveyed capacitor. The robot and thread fastener have their own control panel. The thread fastener is not shown in FIG. 3.

Figure 4:
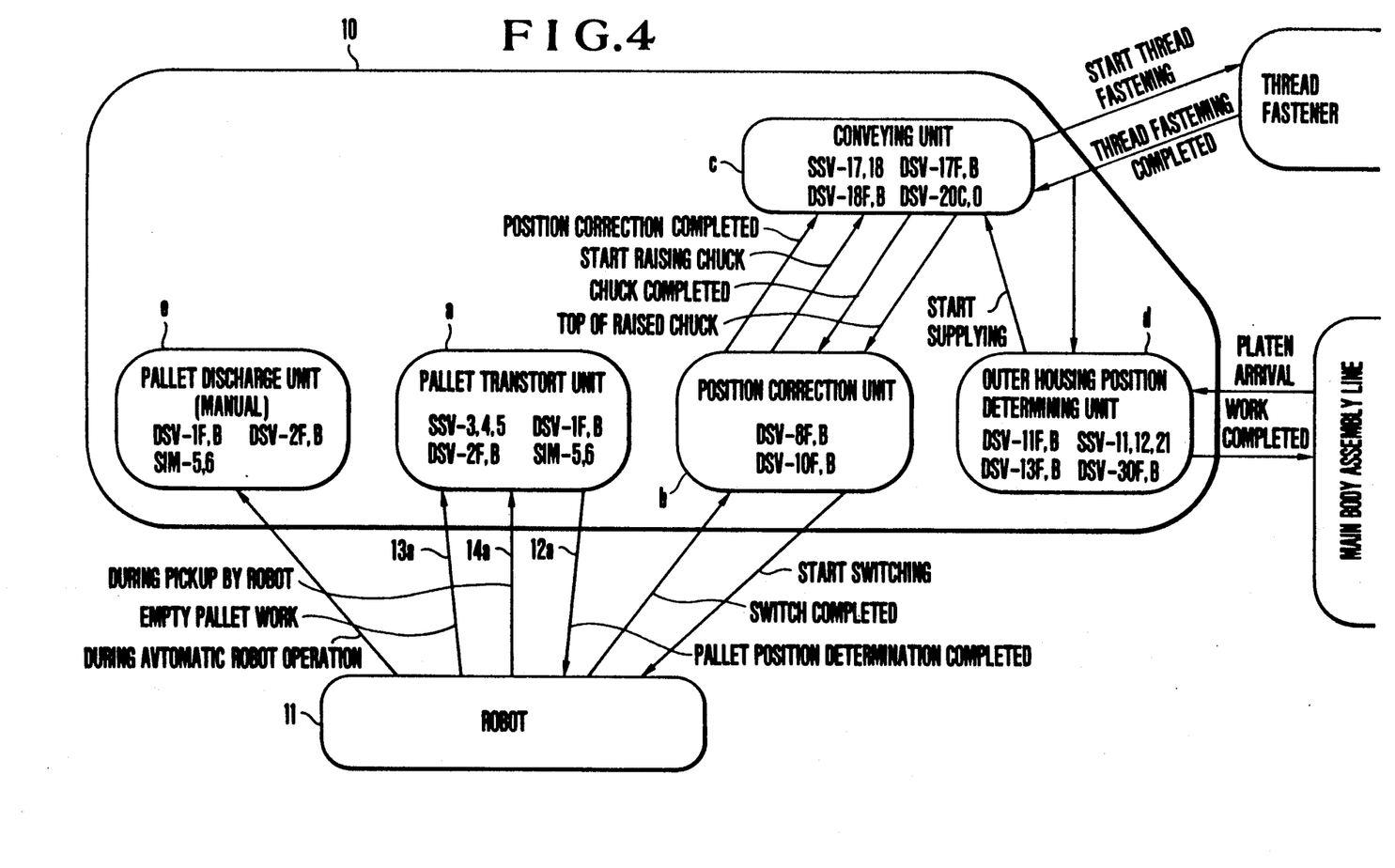
FIG. 4 is a schematic diagram showing a division of the assembling station shown in FIG. 3 into a plurality of control blocks.
Figure 5:
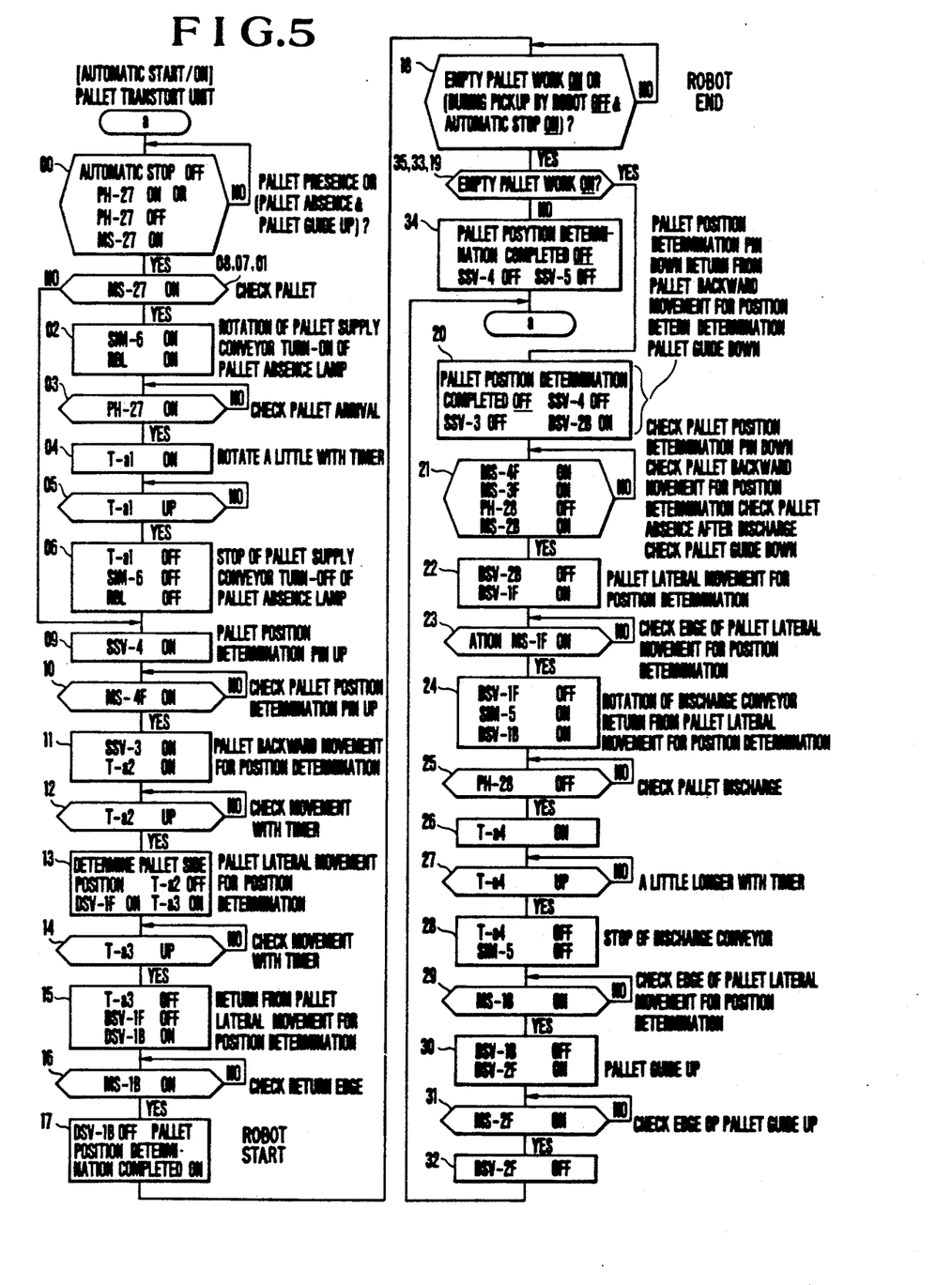
FIG. 5 is a flow chart illustrating in particular the control by the control block a among those blocks shown in FIG. 4.

FIG. 4 and 5 show a division of the mechanism to be controlled into a plurality of blocks while introducing the concept of the division described with reference to FIG. 1. FIG. 4 is a control block diagram showing the overall functional arrangement, and FIG. 5 is a flow chart illustrating the control specification of the control block a among those blocks shown in FIG. 4.

Each control block a, b, c, d shown in FIG. 4 corresponds to the physical, functional blocks with the same representation shown in FIG. 3. The control block e is caused to execute substantially the same function as the control block a during the manual operation.

Each control block shown in FIG. 4 has a control specification for a signal to be outputted therefrom and references to input/output signals, internal signals or the like in other control blocks necessary for the control specification are represented by signal line arrows in FIG. 4. Each signal line is affixed with a signal name so that the relationship between control blocks can be shown in an easily understandable way while giving its physical structure.

For example, it can be seen from the control, block diagram that the position correction unit b and the outer housing position determining unit d are both positioned adjacent to each other yet have no direct relationship so that they are not influenced mutually, and that a capacitor to be assembled is transported via a passage from unit a, the robot, and unit b, to c.

FIG. 5 shows the control specification of the pallet transport unit a among the control blocks. The control specification of this control block is valid while an automatic start signal is ON, and is configured by using the sequential type definition. A set of sequential operations is shown by a combination of input conditions waiting and controlled outputs, with two conditional branches being provided intermediately of the specification.

Steps 02 to 06 indicate the operation of transporting a pallet to the position whereat the robot picks up a capacitor. Steps 09 to 17 indicate the operation of correctly aligning the pallet at the pickup site.

At step 17, a signal representative of "Pallet Position Determination Completed" is supplied to the robot 11. This signal is referenced by the robot so that it is also indicated at 12a in FIG. 4.

Step 18 waits for a reception of an ON signal representative of "Pallet Work Empty" from the robot 11, or an AND output between an ON signal representative of "Automatic Stop" and an OFF signal representative of "During Picking Up by Robot". During the above operations, the robot 11 sequentially picks up capacitors aligned in the pallet one by one. The signals for "Pallet Work Empty" and "During Picking Up by Robot" are also indicated at 13a and 14a in FIG. 4, respectively, to thereby explicitly show the operational relationship between the control block and robot.

Steps 20 to 32 indicate the operation of discharging an empty pallet. Step 34 indicates terminating one cycle of the operation while capacitors still remain in the pallet. Even if each control block independently performs a sequential control as described above, synchronization among control blocks is retained by using a signal referred to between control blocks.

Symbols used for signal names in FIGS. 4 and 5, i.e., PH, MS, SIM, T, SSV, and DSV respectively represent a photosensor, a non-contact microswitch, a timer, a single solenoid valve, and a double solenoid valve. The solenoid valve drives an air cylinder actuator in each functional block shown in FIG. 4.

With the control specification of the control block a using the sequential definition, the operation after step 32 or 34 is adapted to repeat the same operation from the start step. For example, after a pallet is discharged, another pallet is transported unless the "Automatic Stop" signal is ON.

If the "Automatic Start" signal indicating the activation condition turns OFF, then the sequential control is immediately reset at any time when the signal turns OFF, and the controlled outputs from the control block a are all turned OFF to thereby stop the corresponding operations. Any condition can be set in an activation condition for each control block as essential attributes to the control block.

Signals such as "Automatic Stop", "Automatic Start" and the like are supplied from a control block g, which manages the entirety of the mechanism, the signals being not indicated in FIG. 4.

The control block g for managing the entirety of the mechanism controls the condition of the mechanism such as an emergency stop, automatic running, or manual operation, mainly by means of switches and lamps on a main operation console. The management control block g performs a function, common, to all control blocks for the purpose of maintaining the integrity of the mechanism running methods and operation procedures.

Figure 6:
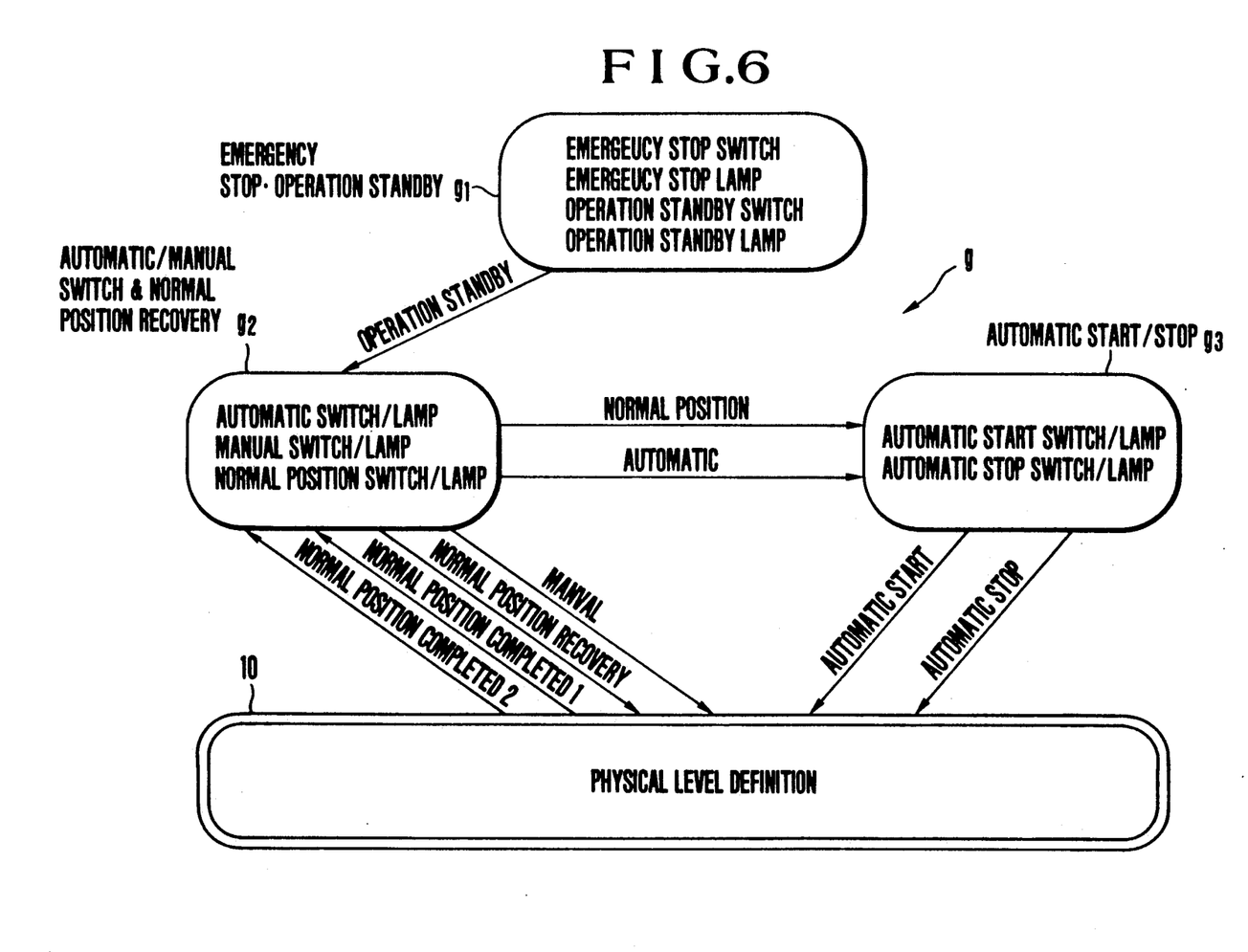
FIG. 6 is a control block diagram used for explaining a management control block.

The control outputs from the control block g are abstract signals such as the "Automatic Start" signal indicating the conditions of the mechanism, so that the position of the management control block g in the control block diagram is not related to the physical structure of the mechanism, as shown in FIG. 6.

The control block having the above-described abstract, shared function is designed to be entered beforehand into the integral control block diagram containing both abstract and physical level control blocks, as shown in FIG. 6.

The sequence programs for the sequence control specification actually made are, therefore, only for the control blocks at the physical level. Common control blocks for managing the entirety of the mechanism can be omitted.

According to the method of configuring the overall control specification by using the programs dispersed to a plurality of control blocks, the management relationship among the control blocks is necessary by using actuation conditions for realizing the hierarchical order of the control blocks. As a result programs for each control block can be made by using definition suitable for the control block, thereby making it easy to make programs. In addition, the programs made for each control block are small in size so that they can be understood easily and have less error.

Figure 7:
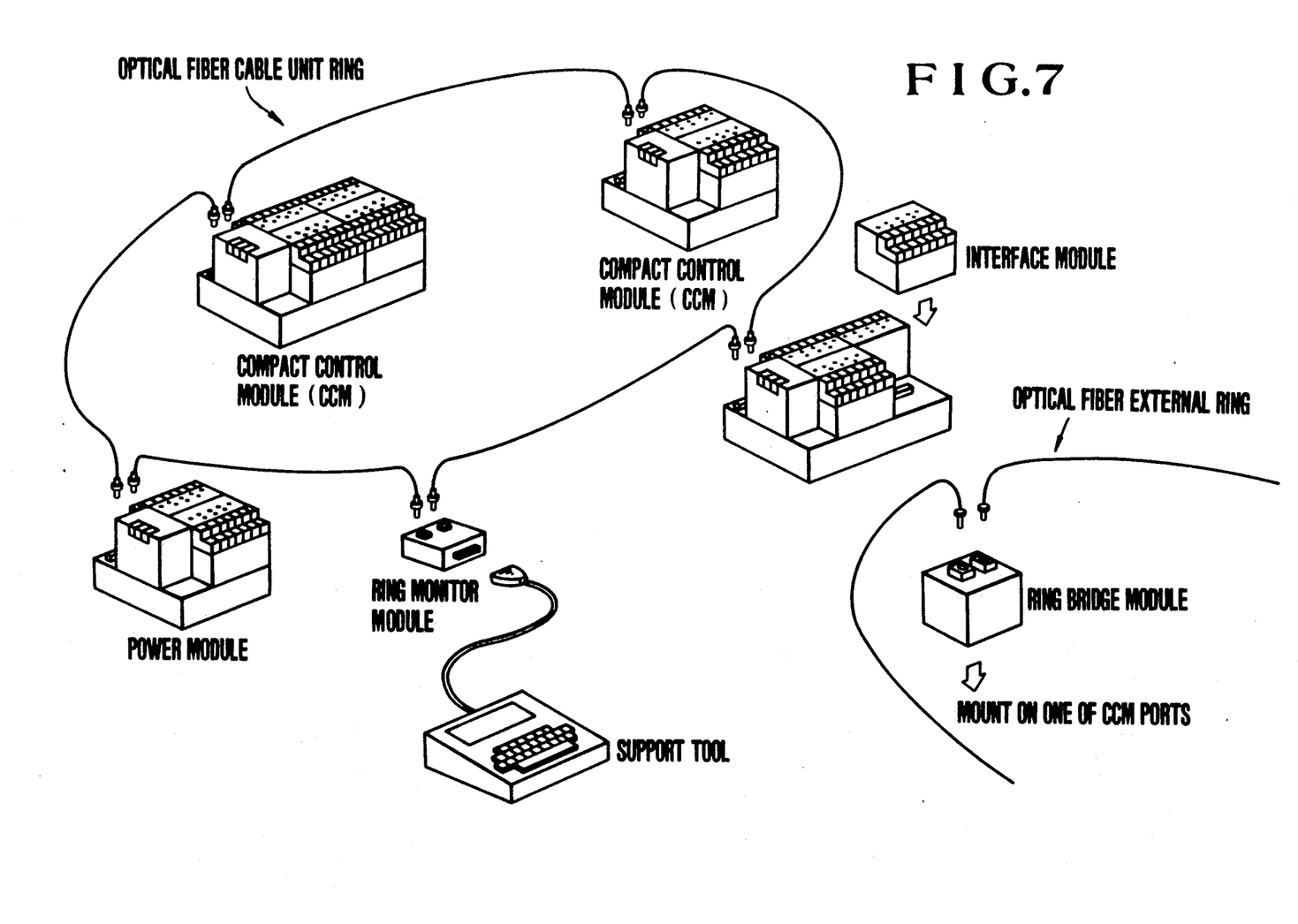
FIG. 7 shows an embodiment of this invention wherein a mechanism is dispersedly controlled by a plurality of PCs.

FIG. 7 shows an example of a plurality of dispersed PCs according to this invention wherein the plurality of PCs can be allocated to respective control blocks in correspondence with the physical structure. In this example, a PC is called a compact control module (CCM). These PCs are arranged to be capable of realizing signal transfer between control blocks with the aid of a ring network function.

Each of the plurality of CCMs (or PCs) executes the programs for at least one control block. If a single CCM executes the programs for two or more control blocks, the operation is carried out in a multi task processing.

Figure 9:
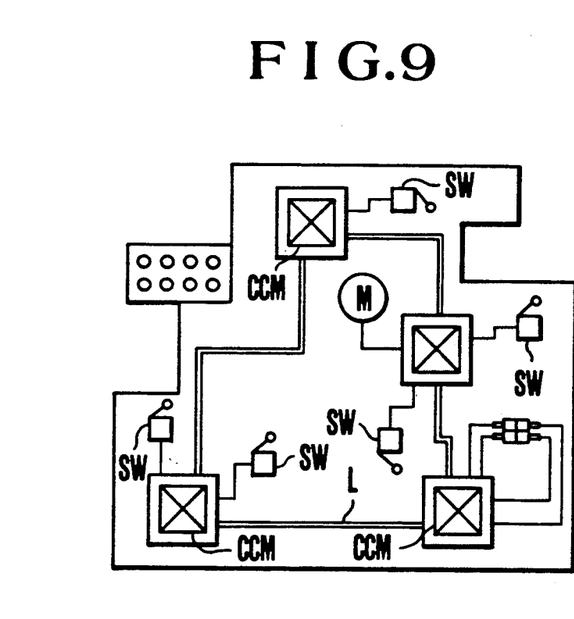
FIG. 9 is a schematic diagram showing how a plurality of PCs control a plurality of functional blocks according to the present invention.

FIG. 9 is a schematic diagram equivalent to the structure shown in FIG. 7 as modified for the purpose of easy comparison with the conventional structure shown in FIG. 8. In FIG. 8, a single PC controls the overall mechanism, whereas in FIG. 9 a plurality of CCMs each execute the programs for one or more control blocks by dividing the programs for the overall mechanism to be controlled into small programs for each control program. As a result, switches SW, motors M and the like can be connected to the input/output port of a nearby CCM, thereby considerably reducing the amount of connection wirings as compared with that shown in FIG. 8.

Figure 10:
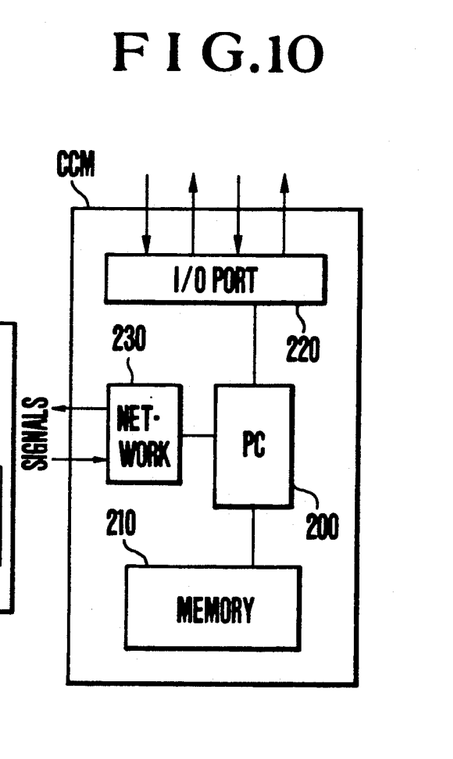
FIG. 10 is a schematic diagram showing the arrangement of one PC shown in FIG. 8.

FIG. 10 shows the internal structure of a single CCM. Referring to FIG. 10, the programs for control blocks assigned to the CCM are stored in a memory 210. While using a referenced signal inputted or outputted when necessary via a network port 230 for retaining synchronization with other control blocks or for other proposes, PC 200 executes the programs stored in the memory 210 in a multi task processing. The controlled outputs obtained as the execution results are outputted from the input/output port 220.

Since the programs for each control block can be made by using a definition suitable for the control by the control block, programs can be made more easily if a particular programming language is used in writing programs.

Table 1 shows an example of a program written with such programming language, the program being executed by one of CCMs.

TABLE 1

| NAME | conden | |
|---|---|---|
| CCM | pallet | |
| IN | ph - 27 | 00 |
| IN | ph - 28 | 01 |
| . | . | . |
| . | . | . |
| . | . | . |
| IN | ms - 4b | 11 |
| OUT | sim - 5 | 20 |
| OUT | sim - 6 | 21 |
| . | . | . |
| . | . | . |
| OUT | dvs - 2b | 31 |
| REF | manual | |
| REF | auto | |
| . | . | |
| . | . | |
| REF | tg - ba | |
| BLOCK | a | [auto/ON] |
| SIG | piend | |
| TMR | t - al | 1.0 |
| . | . | . |
| . | . | . |
| DEFINE | | |
| 00 WAIT | [autost/OFF, (ph - 27 . . . )] | |
| 01 IF | [ms - 27/ON] | |
| 02 DO | sim - 6/ON, rbl/ON | |
| 03 WAIT | [ph - 27/ON] | |
| . | . | |
| . | . | |
| 06 DO | t - al/OFF, sim - 6/OFF . . . | |
| 07 ELSE | | |
| 08 ENDIF | | |
| 09 DO | ssv - 4/ON | |
| . | . | |
| . | . | |
| 18 WAIT | [pentpy/ON! (roff/OFF . . . )] | |
| 19 IF | [pentpy/ON] | |
| 20 DO | piend/OFF, ssv - 4/OFF . . . | |
| . | . | |
| . | . | |
| 32 DO | dsv - 2f/OFF | |
| 33 ELSE | | |
| 34 DO | piend/OFF, ssv - 4/OFF . . . | |
| 35 ENDIF | | |
| 36 RETURN | | |
| ENDB | | |
| BLOCK e | [manual/ON] | |
| =dvs-1f/ON[tg-1mf/ON] | | |
| =dvs-1b/ON[tg-1mb/ON] | | |
| . | | |
| . | | |
| =sim-5/ON[tg-5a/ON] | | |
| =sim-6/ON[tg-6a/ON] | | |
| ENDB | | |

TABLE 1-continued

| NAME | conden |
|---|---|
| END | |

This program is written by the programming language conforming with the program configuration method as described above, and composed of a name definition par in the former half and a control block definition part in the latter half.

The configuration style of a sequence control specification according to this invention uses a control block as configuration unit. In practice, a physically located PC covers several control blocks, and the programs for each control block are collected, and stored in, that PC.

The programs shown in Table 1 are stored in a PC having a name "pallet", and the definitions for both the control blocks a and e are executed.

Each step of the program shown in Table 1 will be described briefly.

The first two lines are statements defining the PC network name and PC name.

Each IN, OUT and REF line is a statement defining the name of input/output signal for the PC, and the signal name referenced by another PC. IN and OUT statements include a connection port number.

Statements starting from BLOCK to ENDB give definition to one control block. After BLOCK, the control block name and its activation condition are defined.

Each SIG and TMR statement defines an internal output signal and timer both present within the control block. Sequential type definition is used from DEFINE line to RETURN statement. The number of each line corresponds to the step shown in FIG. 5.

WAIT statement waits for an input condition, and DO statement indicates an output operation. The contents of the statements indicate the input conditions and outputs which are accompanied by signal names, a judgement state of ON/OFF and the like, or an output state indication name.

IF, ELSE, ENDIF statements realize a structural branch condition.

The = statement is a conditional definition which means that a designation operation relative to the immediately succeeding signal name is being performed while the latter judgement part is satisfied. For example, if a manual signal is ON, a manual switch tg-5a is turned ON to allow the rotation of a discharge conveyor motor sim-5.

In the statements shown in Table 1, a judgement part is represented generally by large parentheses "[" and "]", the AND coupling between elements within the judgement part being represented by ",", and OR coupling by "!". Small parentheses indicate a priority designation.

A series of other control elements required for a general sequence control are also prepared for the language shown in Table 1 although not used therein. Such control elements include the repetition sentence structure by REPEAT or ENDR statement, the definition of a counter and shift register by CNT and SFR statements, and the like.

Further, the status of the inputs/outputs and reference signals are not limited only to bit signals representing ON/OFF conditions. It is possible that they may be replaced by data signals representing values.

The programs shown in Table 1 contain the program for the control program a shown in FIG. 1 and the program for the control block e which shares the controlled outputs. Both the programs are arranged so as not to generate any conflict therebetween to be caused by a difference between activation conditions.

The control block a is the sequential type definition which is the same as shown in FIG. 5, whereas the control block e is the conditional type definition.

If both conditional and sequential type definitions, as indicated at 6 in FIG. 2, are required for a control block, the = statement is placed between the BLOCK statement and the DEFINE statement.

It is also possible to introduce an extended concept wherein the state of input/output and referenced signals is expressed by a numerical data signal instead of an ON/OFF bit signal.

As described above, the sequence control specification is regarded as a collection of physical and abstract functional parts, i.e., control blocks, and the signal transfer therebetween and the internal signal processing are considered separately. The configuration method and programming language for a control specification matching the physical structure of the object to be controlled can be thereby obtained.

According to the present invention, the sequence control specification for each control block is depicted as a control block diagram in a form quite analogous to the physical and functional relationship between elements of the object to be controlled. It is advantageous therefore in that the control arrangement can be visually understood easily.

In the control block diagram, the internal specification of each control block and the relationship to other control blocks can be expressed distinguishably so that without checking the internal definitions of other control blocks in detail, each control block can advantageously perform a dispersed processing.

The control specification of each control block can be defined by a sequential type definition, a conditional type definition or both definitions in accordance with the contents of operation by each control block. A proper definition can thus be selected to advantageously give a representation suitable for the control specification.

I claim:

1. A distributed type sequence controller, comprising:
 a plurality of physical control modules respectively allocated to execution of a respective one of a plurality of control blocks constituting portions of a mechanism to be sequentially controlled by distributed processing by said plurality of physical control modules; and
 communication means interconnecting said physical control modules for allowing signal transmission among said control modules;
 each of said physical control modules including:
 (a) memory means for storing a sequence program for the associated physical control module;
 (b) input means for receiving input signals from at least one of the other physical control modules;
 (c) output means for outputting at least one output signal to be received as the input signal by another physical control module; and
 (d) processing means responsive to at least one of said input signals for starting execution of a part of the sequence program corresponding to said at least one input signal to generate at least one output signal as a result of the execution of the sequence program, whereby said at least one input signal is used as a reference signal for synchronization with operations of another physical control module that issued said at least one input signal.

2. A distributed type sequence controller according to claim 1, further comprising a management control module, connected to said physical control modules, for managing overall control for said physical control modules.

3. A distributed type sequence controller according to claim 2, wherein said management control module includes means for resetting and automatic stopping of the operation of each of said physical control modules.

4. A distributed type sequence controller according to claim 1, wherein said control modules are connected in a form of a network with said communication means.

5. A distributed type sequence controller according to claim 4, wherein said control modules are connected in a form of a ring network.

6. A sequence control method in a distributed type sequence controller, comprising the steps of:

dividing portions of a mechanism to be sequentially controlled in a plurality of control blocks, respectively;

assigning respective ones of a plurality of physical control modules to the execution of respective ones of said plurality of control blocks;

storing, in memory means of each of said physical control modules, a sequential program for executing the control block of the associated physical control module;

wherein each of said physical control modules executes the following steps:

(a) receiving input signals from at least one of the other physical control modules;

(b) responding to at least one of said input signals by starting execution of a part of a sequence program indicated by said at least one input signal, so that said one input signal operates as a reference signal for providing synchronization with execution of operations in another physical control module that issued said at least one input signal; and (c) outputting at least one output signal to be used as the input signal for another physical control module, as a result of the execution of the sequence program.

7. A sequence control method according to claim 6, wherein another control module connected to said control modules is provided for managing overall control for said control modules.

8. A sequence control method according to claim 7, wherein said another control module for management performs resetting, automatic stopping of the operation of each of said control modules.

* * * * *